United States Patent
Mueller

(10) Patent No.: US 7,423,587 B2
(45) Date of Patent: Sep. 9, 2008

(54) METHOD FOR FREQUENCY-DRIVEN GENERATION OF A MULTIRESOLUTION DECOMPOSITION OF THE INPUT TO WAVE-BASED SENSING ARRAYS

(76) Inventor: Rolf Mueller, 3 Mountain View Knolls Dr., Apt. B, Fishkill, NY (US) 12524

( * ) Notice: Subject to any disclaimer, the term of this patent is extended or adjusted under 35 U.S.C. 154(b) by 81 days.

(21) Appl. No.: 11/278,424

(22) Filed: Apr. 2, 2006

(65) Prior Publication Data

US 2007/0229353 A1    Oct. 4, 2007

(51) Int. Cl.
*G01S 13/00* (2006.01)
*G01S 3/16* (2006.01)
*G01S 3/28* (2006.01)
*H04B 7/00* (2006.01)
*H01Q 3/00* (2006.01)

(52) U.S. Cl. ............... 342/378; 342/22; 342/27; 342/155; 342/157; 342/179; 342/195; 342/354; 342/368; 342/379

(58) Field of Classification Search ............ 342/22, 342/27, 155, 157, 179, 195, 354, 368, 375, 342/379–384
See application file for complete search history.

(56) References Cited

U.S. PATENT DOCUMENTS 5,719,966 A * 2/1998 Brill et al. ............ 382/260
5,847,675 A * 12/1998 Poinsard .............. 342/81
5,926,135 A * 7/1999 Minkoff ............... 342/379

\* cited by examiner

*Primary Examiner*—Thomas H. Tarcza
*Assistant Examiner*—Harry Liu

(57) ABSTRACT

A method for generating a multiresolution decomposition of an array signal by a bank of spatial bandpass filters is disclosed. The signal processing operation is implemented through the use of the directivities of the individual array elements and does not degrade the spatial or temporal resolution of the array.

1 Claim, 3 Drawing Sheets

METHOD FOR FREQUENCY-DRIVEN GENERATION OF A MULTIRESOLUTION DECOMPOSITION OF THE INPUT TO WAVE-BASED SENSING ARRAYS

CROSS-REFERENCE TO RELATED APPLICATIONS

Not Applicable

STATEMENT REGARDING FEDERALLY SPONSORED RESEARCH OR DEVELOPMENT

Not Applicable

TECHNICAL FIELD

The present invention relates generally to array signal processing for active or passive wave-based sensing systems with multi-frequency illumination and more particularly to the generation of a multiresolution representation of an array input signal.

BACKGROUND OF THE INVENTION

Physical waves contain information about the physical properties of the objects which emit or reflect them. Measuring and analyzing the waves emitted or reflected by an object of interest is therefore a common technique to gather information about the object. The analysis of emitted or reflected waves can reveal aspects of the object's external geometry, its internal structure, its chemical composition, or its state of motion. Acoustic and electromagnetic waves are most commonly used for this purpose, but many principles used to interpret the properties of received waves are independent of the physical nature of the waves and can hence be generalized to different modalities.

Example applications which analyze received physical waves include sonar (sound waves, most often in water), radar (electromagnetic waves, in air or in space), biomedical ultrasound as well as other modalities used in biomedical diagnosis, and non-destructive testing (e.g., ultrasonic waves in solids).

All sample applications given above make frequent use of sensor arrays. Sensor arrays measure wave-fields at a set of different points in space concurrently. Array output can be used to estimate the spatial characteristics of the wave-field. From these spatial characteristics, both, deterministic and statistical average properties of a wave-source or -reflector can be deduced.

The sensor positions within an array are commonly arranged in a regular fashion, for example in a plane or along some other simple line or surface geometry. The arrangement of the sensors defines the spatial resolution of the array. A high spatial resolution, i.e., many sensors per distance or area unit is favorable for many applications of array sensors because it allows for the analysis of wave-field properties with high spatial frequencies. The maximum number of sensors in an array is limited by the overall size of the array and the size of the individual sensors. The overall size of the array is constrained by the context of the application and the manufacturing cost. The minimum size of the individual sensors is limited by their sensitivity and hence the signal-to-noise ratio of their output signals, both of which typically decrease with sensor size. Together, these two limitations make high array resolutions difficult to achieve.

For high-frequency signals, handling the output of the array can be impractical because of the bandwidth requirements imposed on subsequent signal processing elements cannot be met with reasonable effort. The method of envelope detection is often employed as a remedy in cases where the centered bandwidth of a signal is significantly smaller than its center frequency. In envelope detection, the signal is subjected to an amplitude-demodulation. A person having ordinary skill in the art will know of ways to conveniently approximate envelope detection by such simple operations as, for example, a rectification combined with subsequent lowpass filtering.

A signal processing operation frequently used to extract useful information from the spatial characteristics of a wave-field is spatial bandpass filtering. In spatial bandpass filtering as implemented in prior art, the signals received as a function of sensor position in the array at the same instant in time are treated as a series of input values to the filters. This operation is capable of separating spatial properties existing on various size scales, because output signal components relating to these properties are found in different bandpass channels: Wave-field components varying slowly in space give rise to signals only in bandpass channels with low center- and lower-edge cut-off frequencies, whereas components which exhibit fast spatial changes are detected in bandpass channels with high center and upper-edge cutoff frequencies. Abrupt changes in the wave-field properties over spatial position give rise to a broadband component in the spatial array output. Such a broadband component can be detected by virtue of its simultaneous occurrence in several bandpass channels with non-identical or even non-overlapping passbands. Detection of such abrupt changes is informative, because these signal components correspond to spatial discontinuities in the wave-emitting or reflecting properties, i.e., borderlines at which an object ends or along which its properties change. Because of the nature of wave propagation in which contributions from any emitting or reflecting point can—potentially—impact any sensor, "edges" seen in an array output signal may also reflect spatially distributed properties of the reflector or emitter. Besides their application in interpreting an array output signal, bandpass filters are also commonly used for compressing signals and reducing the transmission bandwidth required by a signal. The decomposition of a signal into a set signals which reflect information at different scales is commonly referred to as a "multiresolution" pyramid in the areas of image processing and pattern recognition. Here, the term "multiresoltion decomposition" is used to denote such a decomposition regardless of the physical nature of the signal, its origin, its dimensionality, or the intended use of the representation.

In image processing and image analysis, the concepts of spatial bandpass filtering and detection of spatial discontinuities are formalized by the notion of multiresolution decompositions using a set of wavelets as orthogonal basis functions. These concepts are used extensively in algorithms for image representation and compression as well as for the purpose of image interpretation. For the latter objective, spatial bandpass filter impulse responses such as the Laplacian of Gaussian ("Mexican Hat") and the Difference of Gaussian functions have been used extensively to detect edges which are particularly informative about image content.

The far-field behavior of an individual sensor for a wave is described completely by its directivity pattern. The directivity pattern specifies how the sensor's sensitivity is distributed as a function of direction and frequency. Therefore, the directivity pattern is also a description of a spatial filtering operation performed by the individual sensor.

BRIEF SUMMARY OF THE INVENTION

The conventional method of performing a spatial filtering operation across the elements of a sensing array by treating each sensor output as a value in the input sequence to a spatial bandpass filter is replaced with a new method: Each individual array sensor is sensitive to at least two frequency components. For each of those components, it exhibits a different directivity pattern of suitable shape. Allocation of element sensitivity by the directivity patterns alternates between neighboring frequencies. In one of these patterns, the center-type directivity pattern, most of the sensitivity is allocated to central main-lobe whereas in the other, the surround-type, the sensor is most sensitive over a belt of side-lobes which surrounds the direction of the main-lobe in the previous pattern.

The output of the individual sensors is processed by a bandpass filter with suitable passband for each frequency of interest. The bandpass outputs are then demodulated and subtracted for each pair of bandpass filters. The result of combining the inputs obtained for two frequencies is a spatial bandpass filter characteristic. Using multiple frequencies for which the directivity patterns alternate between a center- and a surround-type and also decrease in width with increasing frequency can generate output values along the resolution axis of an entire multiresolution pyramid decomposition from the output of a single array element.

It should also be realized that the new method performs the spatial bandpass filtering and multiresolution pyramid decomposition operations in the three-dimensional space of the wave-emitting or wave-reflecting object, not over the surface of the array. This is preferable under many circumstances, because it is not subject to a degradation of the spatial information or the introduction of ambiguities due to a three-dimensional wave-field being collapsed on an array surface of lower dimensionality.

The new method conserves the full spatial and temporal resolution of the of the array without adding significant complexity to the required signal processing operations.

BRIEF DESCRIPTION OF THE DRAWINGS

For a more complete understanding of the present invention, and its advantages, reference is now made to the following descriptions taken in conjunction with the accompanying drawings:

FIG. 1a shows the center-type beam pattern which contains a single main-lobe modelled by a Gaussian over angle. FIG. 1b shows the surround-type directivity pattern which comprises a ring of Gaussians displaced from the main-lobe. FIG. 1c shows the difference of the center- and surround-type directivity patterns of FIGS. 1a and 1b and thus demonstrates that the impulse response of a spatial bandpass is formed in the plane by subtracting the surround-type from the center-type directivity pattern.

DETAILED DESCRIPTION OF THE INVENTION

Figure 1:
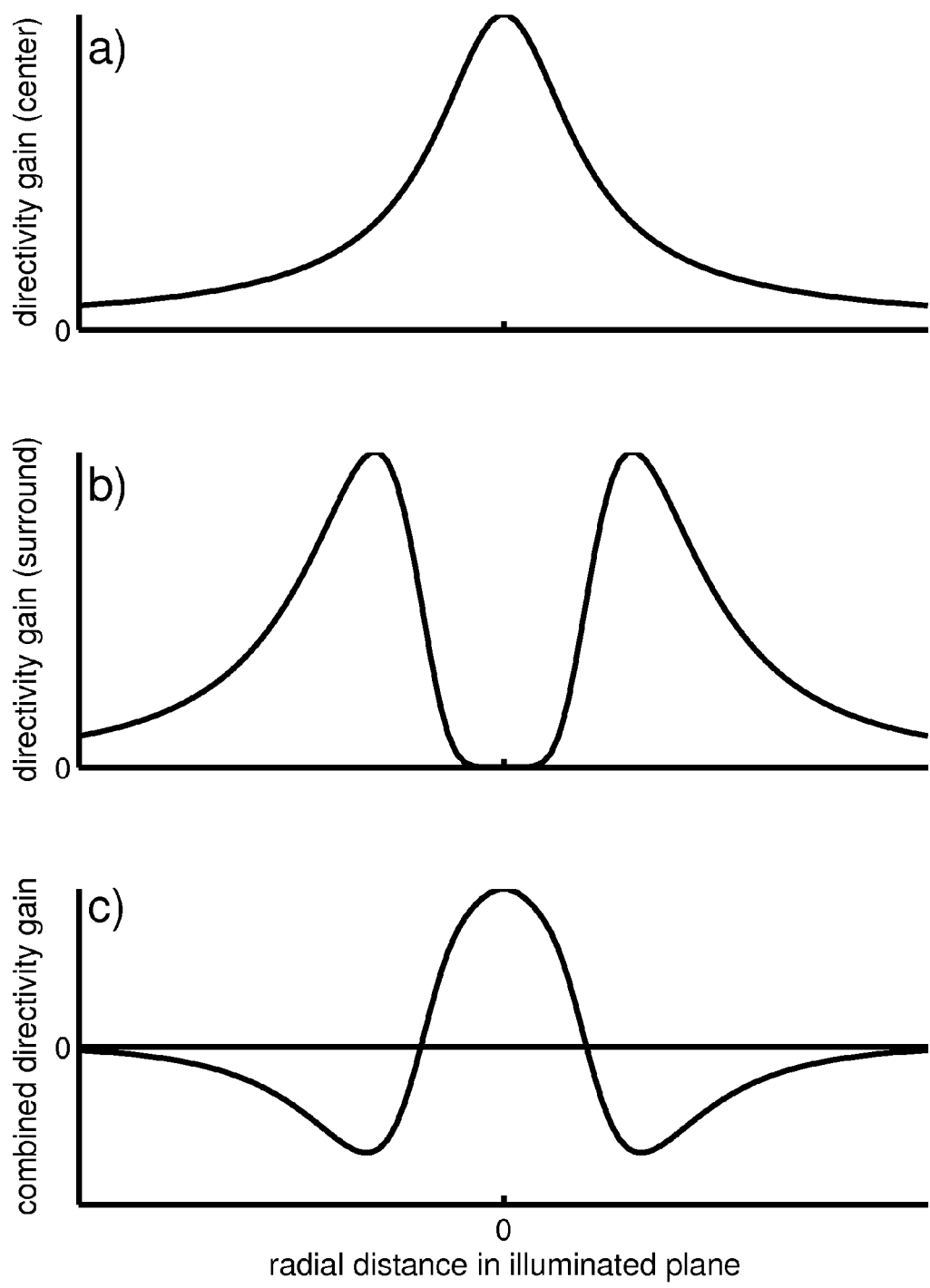
FIG. 1 shows the footprint (spotlight) of a Gaussian beam model on a planar surface. The Gaussian beam model is a suitable approximation for the beam pattern of a piston (side-lobes are neglected) and is used here for illustration of the invention. It should be realized by those skilled in the art that the use of different beam shapes does not depart from the spirit and scope of the invention as set forth in the appended claims.
Figure 2:
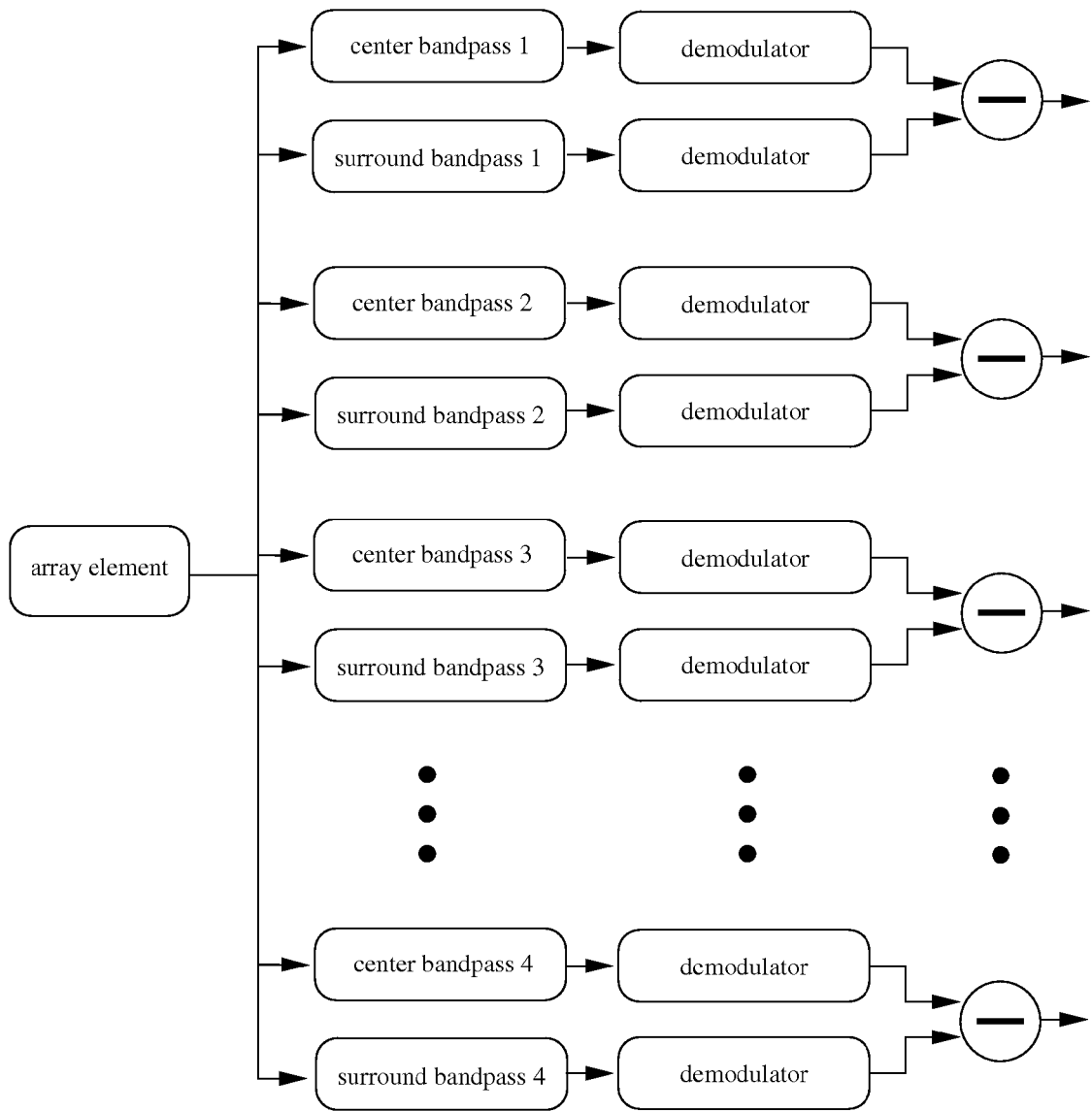
FIG. 2 shows a block diagram of the signal processing associated with each single array element: The output signal from each array element is processed by a bank of bandpass filters. The center frequencies of the bandpass filters in the bank correspond to frequencies for which the directivity pattern of the array element sensor alternates between center- and surround-type. The bandpass-filtering operation is followed by a demodulation in each channel. The demodulated signals are then combined pairwise such that the signals corresponding to the surround-type directivity pattern are subtracted from the signals corresponding to the center-type directivity pattern.
Figure 3:
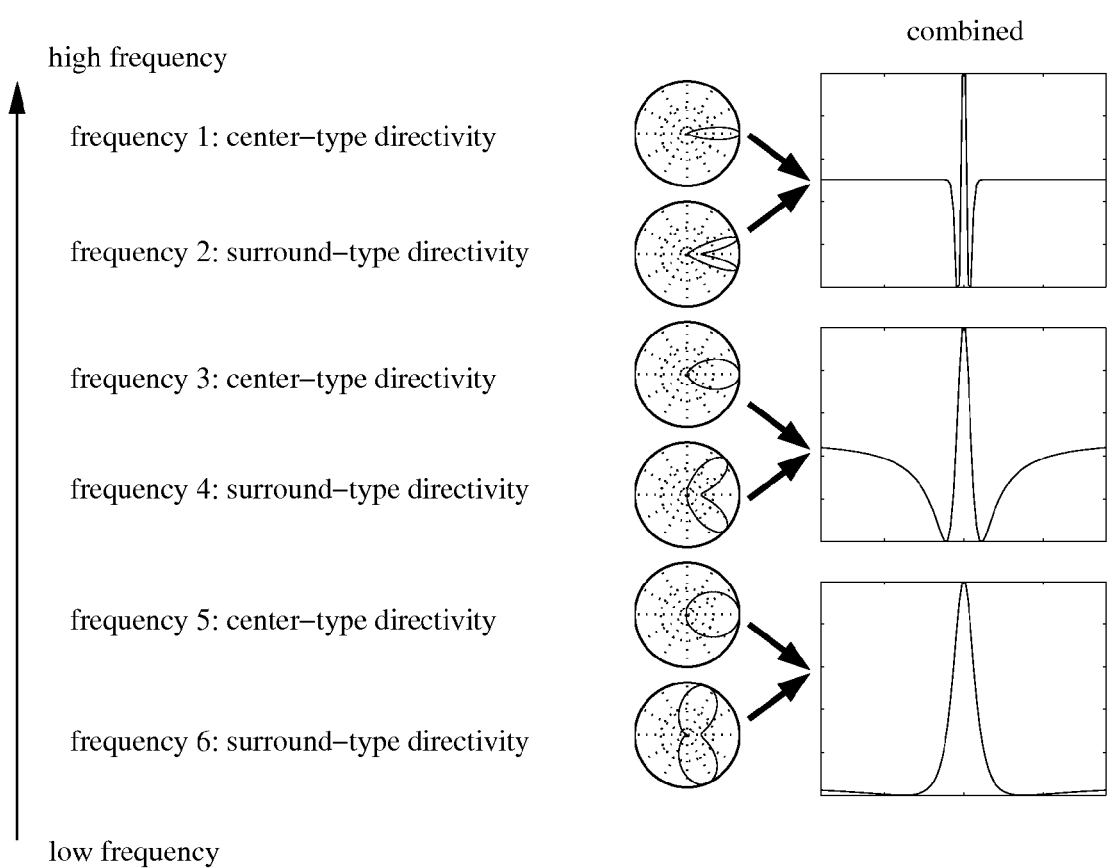
FIG. 3 shows the generation of a multiresolution decomposition (multiresolution pyramid) from the output of a single array sensor element. A set of frequencies is considered for which the sensor's directivity pattern alternates between center- and surround-type. At the same time, the overall width of the center- and surround-type directivity patterns changes to generate spatial band-pass filters operating at different scales. In the arrangement shown in the figure, sensor elements display wider directivity patterns at lower frequencies. This choice is advantageous, because it is in accordance with basic physical constraints imposed by the changing ratio of sensor diameter and wavelength and hence allows to use the widest range of beam-widths.

Spatial bandpass filtering in general and the generation of an entire multiresolution decomposition (multiresolution pyramid) of an array signal in particular is performed using a sequence of suitable sensor directivity patterns alternating in shape-type over frequency.

The sensor directivity patterns employed by the method are of two different types: a "center-type" and a "surround-type". In the center-type directivity pattern, the majority of the sensor's sensitivity is allocated to a main-lobe, i.e., as much as possible of the sensor's sensitivity is concentrated inside a narrow range of directions both in azimuth and in elevation. In the surround-type directivity pattern, the directions of significant sensor sensitivity form a belt around the direction of the center-type directivity's main-lobe.

A spatial bandpass filtering operation is performed by combining sensor output for two different frequencies. These frequencies are chosen such that the sensor's directivity pattern for one of the frequencies is of the center-type and of the surround-type for the other. To isolate these frequency components from the input, two bandpass filters operating on the output signal of a single array element are required. The two resulting bandpass channels are referred to as the "center-bandpass channel" and the "surround-bandpass channel".

A necessary and sufficient condition for the method to work is that the spatial nature of the input signal, i.e., the emission or reflections from the object of interest, must not change significantly between the two frequencies of the center- and the surround-type directivity patterns. Failure to meet this condition would undermine the interpretation of the subtraction operation to form the spatial bandpass filter. The necessity of this condition is limited to the spatial resolution of interest. Differences at smaller spatial scales are not relevant unless the affect the overall average. Differences at larger spatial scales are suppressed by the spatial bandpass characteristic of the system considered.

An important implementation detail which needs to be realized is that the surround-type directivity must be shaped so that its sensitive directions are arranged around the outer edge of the center-type directivity it is to be combined with. This implies that it must have a minimal gain in the direction of the main-lobe of the center directivity pattern. If this is not the case, subtraction of the signals corresponding to the two directivities will result in degradation of signal-to-noise ratio. Following the same rationale, the center-type directivity should have as little energy as possible contained in sidelobes. Therefore, center- and surround directivity patterns meeting these specifications are required to achieve good results. Other approaches, such as scaling the width of the same kind of directivity pattern to two different values will result in an inferior performance. It should be realized, however, that variation in the exact shape of the center- and surround directivity patterns do not depart from the spirit and scope of the invention as set forth in the appended claims.

The output signals of the spatial bandpass filters are demodulated before the signal amplitude in the surround-bandpass channel is subtracted from the amplitude in the center-bandpass channel. The demodulation operation facilitates the determination of the difference in the amplitude values of the center- and surround-bandpass channels. Without the demodulation step, an amplitude modulation due to the two different frequencies would be present in the subtraction result. The difference in amplitude could also be obtained from an analysis of this amplitude modulation, but it should also be realized by those skilled in the art that such alternatives do not depart from the spirit and scope of the invention as set forth in the appended claims.

In order to obtain a multiresolution decomposition of the input, a set of input frequencies within the sensitivity range of the array elements is used. Along these frequencies, center- and surround directivity patterns alternate between neighboring frequencies. This allows it to use pairs of neighboring frequencies to form spatial bandpass filters by subtracting the envelopes of the output signal components corresponding to these frequencies. Spatial bandpass filters operating on different scales are formed by changing the width of both, the center- and the surround-directivity patterns as a function of frequency. The relationship between directivity pattern and the ratio between the characteristic dimension of a sensor and the wavelength determines the minimum width of a beam pattern. For a given characteristic sensor dimension, low frequencies will have a larger minimum beam-width than high frequencies.

The major technical advantage of the present invention is its ability to conserve the spatial and temporal resolution of the array. Because it is not necessary to combine array elements to generate the spatial bandpass characteristic, each array element yields one point in the representations of the array input signal at all spatial scales. Therefore, the full spatial resolution of the system is conserved. Likewise, no reconfiguration of the array or its elements nor is sequential acquisition of different input signal required. Therefore, the temporal resolution of the array remains unaffected by the generation of the multiresolution representation.

Suitable element beam patterns may be realized through— for example—beamforming baffles or by subdividing each sensor surface into a suitable spatial pattern of elements. The design of such sensors is simplified by the fact that sensor properties are static and only a single output signal per array element needs to be generated. On a small scale, such devices may be fabricated using microelectromechanical-systems (MEMS) technology. Current methods for beam pattern synthesis are sufficient to allow a person skilled in the art to build a sensor device with these properties. The method claimed here is independent of the chosen implementation and hence applies to all sensor implementations.

What is claimed is:

1. A method for performing a multiresolution decomposition of an input signal to a wave-based sensing array into a plurality of outputs of spatial bandpass filters comprising the steps of:
    a) generating at least two different types of directivity pattern for each of a plurality of frequency components in the input signal for each array sensor: at least one of the types being a center-type directivity pattern which concentrates the spatial sensitivity in a central main-lobe and at least one of the types being a surround-type directivity pattern which surrounds the direction of the center-type directivity's main-lobe with its most sensitive region;
    b) scaling the center-type and surround-type directivity patterns with frequency so that a plurality of different beam-widths are produced;
    c) forming center-type and surround-type bandpass channels by isolating frequency components corresponding to the center-type and surround-type directivity patterns via bandpass-filtering performed on the input signal of a single sensor, pairwise combining the outputs the center-type channels with the surround-type channels matching in spatial scale, and determining an amplitude difference between the channels.

* * * * *